Dec. 13, 1938.  J. COTTS  2,139,999

MULTIPLE BAKING PAN

Filed March 23, 1936

INVENTOR
James Cotts.
BY
H.S. Johnson
ATTORNEY

Patented Dec. 13, 1938

2,139,999

UNITED STATES PATENT OFFICE 2,139,999

MULTIPLE BAKING PAN

James Cotts, St. Paul, Minn., assignor to Ashley F. Ward, Cincinnati, Ohio

Application March 23, 1936, Serial No. 70,468

2 Claims. (Cl. 53—6)

My invention relates to improvements in multiple baking pans.

An object of the present invention is to provide connection means for the multiple pans which will allow each pan in a set to rest upon the oven hearth, remedying the objectionable features of the ordinary multiple pans where some of the pans, in resting unevenly upon the hearth, result in warping.

These and other features of the invention will be more specifically set forth in the following description and the accompanying drawing, wherein.

Figure 1:
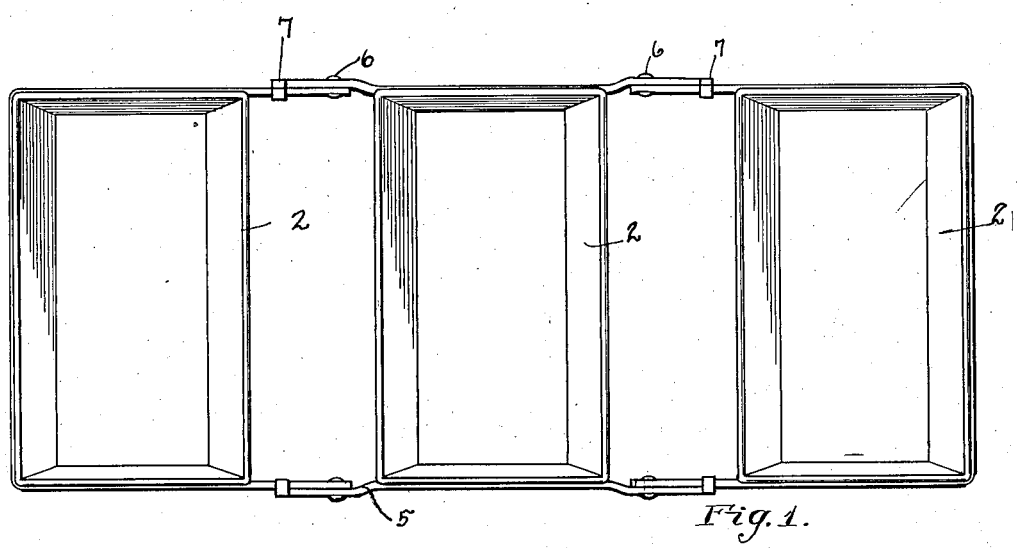
Figure 1 is a plan view of a baking pan set embodying my invention.

Referring to the drawing in detail, the customary method of forming a number of pans into a set or baking unit is to fixedly bind them together and hold the pans in rigid relationship. Where such sets have been used for some time warping results, causing some of the pans to rest unevenly and, therefore, not touching the hearth. This results in uneven baking and in the wasting of fuel, as more heat has to be applied than where the pans evenly rest upon the hearth.

In my improved construction, I provide a plurality of ordinary baking pans 2. In the adaptation of my invention, shown in Figures 1 and 2, straps 3 and 4 extend around and are secured to the end pans, the ends of said straps projecting inwardly beyond the pans. Straps 5 are secured to the sides of the intermediate pan and project outwardly beyond said sides.

Figure 2:
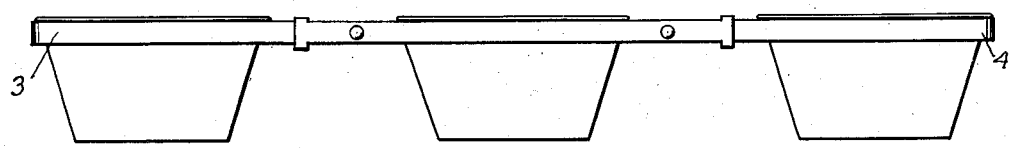
Figure 2 is a view in side elevation of the same.

In the adaptation shown in Figures 1 and 2, the ends of the straps 3 and 4, and the ends of the straps 5, overlap and are pivotally connected by the pivots 6. The ends of the straps 5 are formed with lateral flanges 7 overlapping the straps 3 and 4, said flanges being sufficiently spaced around the straps 3 and 4 to permit a limited swinging action to the pans with respect to each other through the medium of the pivots 6.

Figure 3:
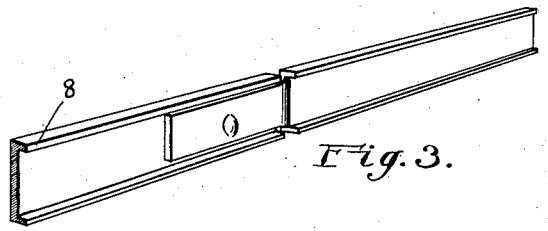
Figure 3 is a view in detail of a modified form of the connection between the pans shown in Figures 1 and 2.

In the form shown in Figure 3 I utilize an angle bar construction wherein the flanges 8 of the angle bar act as do the flanges 7.

Figure 4:
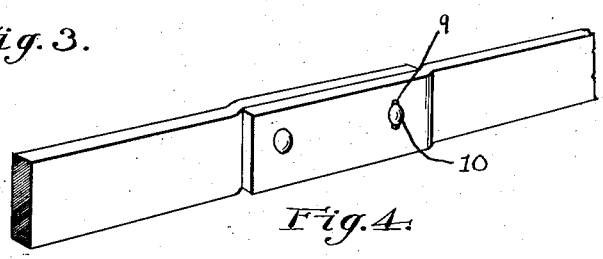
Figure 4 is a view in detail of a modified form of connection between the pans.

In the form shown in Figure 4 I utilize flat straps connected by double pivots with one of the straps formed with a vertical slot 9 receiving the pivot 10.

As will be apparent, the pans will have a limited vertical movement with respect to each other through the medium of the pivots, resulting in the pans all remaining in contact with the hearth, where the pans, through the warping that ordinarily takes place in the use of these baking units, are carried out of position with respect to each other.

By means of my improved features of construction, a freely supported pan may not only drop in relation to the other pans, but may also be tilted to insure a close contact with the hearth, even where material warping takes place.

By the described features of construction, the advantages heretofore set forth are not only secured, but the pan unit will last much longer and production costs are cut down.

I claim:

1. A set of baking pans comprising a plurality of baking pans, a jointed strapping for the set of pans consisting of sections which are secured to the sides of the pans near the top thereof and extend beyond the sides of the pans toward adjacent pans, and pivotal connections between the adjacent ends of the strap sections between the pans and stops for so limiting the movement of said pivotal connections that the jointed strapping holds the pans assembled as a set with the pans held in substantially the same horizontal plane but permits a limited vertical relative movement between the individual pans to allow each pan independently to adjust itself to an oven hearth.

2. A set of baking pans comprising a plurality of baking pans, a jointed strapping for the set of pans consisting of sections which are secured to the sides of the pans near the top thereof, and pivotal connections between the ends of the strap sections and stops for so limiting the movement of said pivotal connections that the jointed strapping holds the pans assembled as a set with the pans held in substantially the same horizontal plane but permits a limited vertical relative movement between the individual pans to allow each pan independently to adjust itself to an oven hearth.

JAMES COTTS.